United States Patent
Chung et al.

(10) Patent No.: US 7,937,124 B2
(45) Date of Patent: May 3, 2011

(54) VERSATILE SYSTEM FOR ADAPTIVE MOBILE STATION ANTENNA

(75) Inventors: Yong Woo Chung, Frisco, TX (US); Joseph R. Cleveland, Murphy, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 964 days.

(21) Appl. No.: 11/391,089

(22) Filed: Mar. 28, 2006

(65) Prior Publication Data

US 2007/0238496 A1   Oct. 11, 2007

(51) Int. Cl.
*H04M 1/00* (2006.01)

(52) U.S. Cl. .............. 455/575.2; 455/63.4; 343/846; 343/850

(58) Field of Classification Search .............. None
See application file for complete search history.

(56) References Cited

U.S. PATENT DOCUMENTS

| | | | |
|---|---|---|---|
| 6,043,790 A * | 3/2000 | Derneryd et al. | 343/853 |
| 6,160,510 A * | 12/2000 | Busking et al. | 342/374 |
| 6,985,113 B2 * | 1/2006 | Nishimura et al. | 343/702 |
| 2002/0021246 A1 * | 2/2002 | Martek et al. | 342/373 |
| 2003/0210203 A1 * | 11/2003 | Phillips et al. | 343/850 |
| 2003/0232633 A1 * | 12/2003 | Iida et al. | 455/575.7 |
| 2006/0030260 A1 * | 2/2006 | Ito et al. | 455/3.05 |

* cited by examiner

*Primary Examiner* — Zhiyu Lu

(57) ABSTRACT

A system for providing an adaptive antenna system in a mobile communications device is disclosed. An array of antenna elements is provided. A sensing component is disposed along a surface of the mobile communications device, proximal to the array of antenna elements. A processor component is communicatively coupled to the sensing component. An implementation element is communicatively coupled to the processor component, and to the array of antenna elements. The sensor component generates data characterizing the proximity of a foreign object to the array of antenna elements; which the processing component uses to determine a configuration for the array of antenna elements. The implementation element modifies the array of antenna elements, responsive to the configuration determined by the processor component.

24 Claims, 3 Drawing Sheets

US 7,937,124 B2

VERSATILE SYSTEM FOR ADAPTIVE MOBILE STATION ANTENNA

TECHNICAL FIELD OF THE INVENTION

The present application relates generally to wireless communication devices and, more specifically, to apparatus and methods for providing an adaptive antenna system that overcomes performance losses otherwise due to proximity of an external object to a mobile station antenna.

BACKGROUND OF THE INVENTION

Mobile communication devices are fast becoming ubiquitous. These devices commonly utilize one or more antenna systems to facilitate signal transmissions—both transmitting and receiving—with some wireless host system or network. Maximizing the strength and reliability of such transmissions is one common concern in antenna design. Ideally, an antenna of the highest possible power would, in most cases, provide optimal transmission performance.

Practically, however, there are several other design concerns that must be balanced against maximizing antenna power. Most mobile communications devices operate—at least partially—on battery power. Thus, in order to maximize battery life and be commercially viable, all components and sub-systems within a mobile communications device—including an antenna system—must utilize as little power as practical. Various regulatory and industry restrictions or standards limiting antenna system power levels must also be considered and addressed. For example, governmental regulations on SAR (specific absorption ratio) values can limit the amount of power with which an antenna system may transmit. Thus, mobile communications device designers and manufacturers must attempt to optimize antenna system performance within some limited range of operating conditions.

Although the performance of a given antenna system may thus be optimized from a design perspective, its actual performance while in use may be impacted by a number of operating environment variables. Physical barriers or obstructions, and sources of signal interference, can degrade antenna performance levels, and erode communications reliability. To a certain extent, some such deleterious conditions cannot be avoided or obviated. Consider, for example, the effects of a user's body components—particularly the hand and fingers—on the antenna performance of a wireless phone.

The proximity of a user's head, hand, fingers or other body component can significantly decrease antenna performance levels. Where a hand or fingers cover some or all of a mobile device antenna, absorption effects can attenuate transmitted or received signals. Close proximity of a body component to an antenna can also increase VSWR (voltage standing wave ratio) levels—decreasing antenna efficiency.

Conventionally, mobile station antenna systems do not change antenna configuration based upon proximity of some obstruction or interference source—particularly a user's body component. A number of systems simply accept or ignore such conditions. Some systems attempt to compensate by providing some form of tuning circuitry. Unfortunately, however, such approaches can add significant expense and commonly provide only suboptimal performance. Most conventional tuning circuitry is passive in nature, and designed to provide fixed compensation over some fixed range.

As a result, there is a need for a system that provides an adaptive antenna system in a mobile communications device that compensates for a wide range of actual operating conditions in an easy and cost-effective manner.

SUMMARY OF THE INVENTION

A versatile system, comprising various apparatus and methods, provides an adaptive antenna system in a mobile communications device. The present antenna system detects certain variations in an operational environment, and adaptively modifies antenna configuration or geometry to minimize or obviate the impact of those variations on device performance and reliability. The present antenna system may be efficiently and cost-effectively implemented in a wide variety of mobile communication devices.

Specifically, constructs and methods for sensing and analyzing changes in the operational environment of a mobile communications device, determining an optimal antenna configuration based on those changes, and implementing the optimal antenna configuration are disclosed. Within the present system, a sensing component is provided at or around the antenna area to detect and measure sources of antenna interference or obstruction. A processing component evaluates data from the sensing component and determines a corresponding optimal configuration of antenna elements within the mobile communications device. An implementation element then adapts members of an array of antenna elements to conform to that optimal configuration.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the terms "processor" or "controller" means any device, system or part thereof that performs at least one processing or control operation, such a device may be implemented in hardware, firmware or software, or some combination of at least two of the same. It should be noted that the functionality associated with any particular processor or controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1-4, discussed below, and the various embodiments used to describe the principles of the present disclosure in this patent document are by way of illustration only, and should not be construed in any way to limit the scope of the disclosure. Hereinafter, certain aspects of the present disclosure are described in relation to illustrative embodiments and operations of mobile communications devices—particularly mobile stations or handsets utilized as mobile phones. Those skilled in the art, however, will understand that the principles and teachings of the present disclosure may be implemented in any suitably arranged mobile communications device or system—regardless of the specific form factor or functionality of that device or system.

The following discloses a versatile system—comprising various apparatus and methods—for an adaptive antenna in a mobile communications device. The proximity of perturbing objects—sources of interference or obstruction—to an antenna may change its impedance, efficiency, VSWR, and radiation characteristics. The present antenna system detects certain variations in an operational environment—particularly the proximity of perturbing objects—and responsively modifies antenna configuration or geometry to minimize or obviate the impact of those variations on the performance and reliability of the mobile communications device. The present antenna system is readily adaptable to a wide variety of device configurations, manufacturing processes and materials, and operational environments.

Specifically, constructs and methods for sensing and analyzing changes in the operational environment of a mobile communications device, determining an optimal antenna configuration based on those changes, and implementing the optimal antenna configuration are disclosed. Within the present system, a sensing component is provided at or around the antenna area to detect and measure sources of antenna interference or obstruction. A processing component evaluates data from the sensing component and determines a corresponding optimal configuration of antenna elements within the mobile communications device. An implementation element then adapts members of an array of antenna elements to conform to that optimal configuration.

Figure 1:
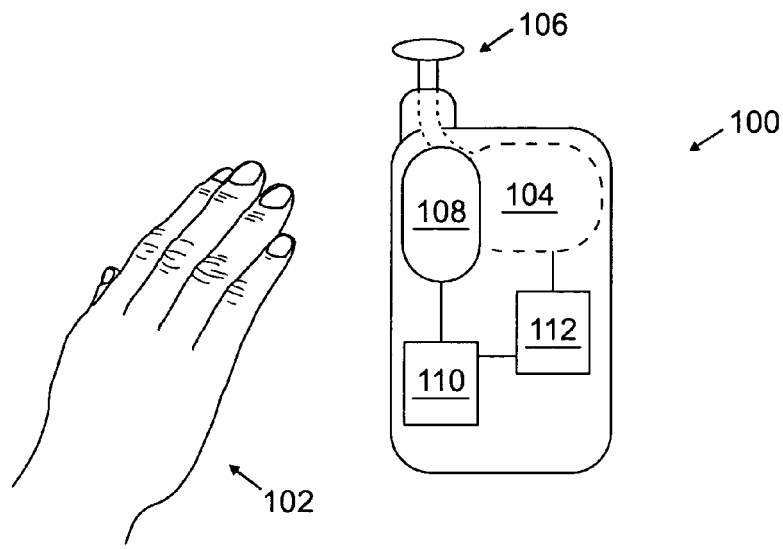
FIG. 1 depicts one embodiment of a mobile communications device according to certain aspects of the present disclosure.

This is illustrated in greater detail with reference now to FIG. 1, which provides a block diagram depiction of a mobile station (MS) 100 according to certain aspects of the present disclosure. MS 100 may comprise any suitable mobile communications device, but for purposes of illustration and explanation, it is depicted in FIG. 1 as having a mobile phone form factor. In other alternative embodiments, MS 100 may comprise a wireless network terminal, a wireless PDA, a notebook or palm-top computer, or any other suitable device or system relying upon antenna-based communications.

During its operation, MS 100 may be exposed to various sources of antenna interference or obstruction, represented in this embodiment by source 102. One common source of such interference or obstruction is, as depicted in FIG. 1, some body component of a user—such as a head, hand or fingers.

MS 100 comprises an array of antenna elements 104, comprising or coupled to an aerial 106, or some other suitable external antenna structure. In alternative embodiments, an external antenna structure may be omitted. Antenna elements 104 may comprise a variety of homogenous or heterogeneous antenna elements that may be selected individually or in combination, as described in greater detail hereinafter. Depending upon the specific nature and use of MS 100, the antenna elements may comprise a plurality of wireline antenna, a matrix of discrete, selectable wireline segments, one or more conformal antenna components, one or more patch antennas, or other similar suitable structural elements. Depending upon the specific requirements of different embodiments, any suitable number of antenna elements 104 may be provided, and disposed in any desired or required location throughout MS 100.

MS 100 further comprises a sensing component 108, disposed in proximity to aerial 106 or array 104. Sensing component 108 may comprise a variety of homogenous or heterogeneous sensor or detector elements disposed, at least in part, along or near the outer surface of MS 100. In one embodiment, for example, sensing component 108 may be disposed along an outer surface of MS 100, where it may come into direct physical contact or proximity with a user body component. In another embodiment, sensing component 108 may be disposed within MS 100—along the inside surface of a housing or casing, for example (not shown). In certain embodiments, component 108 may comprise a number of capacitive-type touch or proximity sensors. In other embodiments, component 108 may comprise a number of optical sensors. In still other embodiments, component 108 may comprise some other type of touch or proximity sensor, or various combinations of such sensors.

MS 100 further comprises a processing component 110 and an implementation element 112. Processing component 110 may comprise any suitable hardware, software, firmware or combination thereof. In certain embodiments, for example, component 110 may comprise a code segment or routine operating on a digital signal processor (DSP). Implementation element 112 may be provided as an integrated part of component 110, or as a separate functional element. For example, implementation element 112 may comprise some form of programmable logic or multiplexing circuitry associated with array 104.

As previously noted, proximity of certain objects—such as source 102—to an antenna can change its impedance, efficiency, VSWR and radiation characteristics. Functionally, the system of the present disclosure overcomes such issues by detecting the proximity of perturbing source 102; and responsively modifying the configuration or arrangement of antenna array 104 elements. Sensing component 108 may comprise a plurality of individual sensing elements arrayed across the surface of MS 100, laterally, longitudinally, or both. The number and specific arrangement of such sensing elements may be varied greatly, depending upon the type of sensor used, the location and orientation of antenna 106 and array 104, and the physical and performance characteristics of MS 100. Generally, a sufficient number of sensing elements should be disposed along MS 100, in relation to antenna 106 and array 104, such that a measurement or determination of the location of source 102 in relation thereto may be obtained with some granularity. For example, a lateral array of 10 sensing elements may be disposed along the upper portion of MS 100, around the base of aerial 106, to obtain a gradient of proximity for source 102. Each sensing element may be either qualitative or quantitative in nature—determining, respectively, either the mere presence of a perturbing source, or the relative proximity or magnitude of the source.

Information from sensor component 108 is communicated to processing component 110. Component 110 has access to data characterizing available configurations of array 104. Component 110 analyzes—using a mathematical formula or algorithm, a look-up table, or some other suitable construct— the information obtained from component 108 to select a configuration of array 104 that optimizes antenna performance in the presence of source 102. A number of factors, in addition to the presence or magnitude of source 102, may be comprehended in the selection process—such as required transmission/reception levels, SAR values, VSWR and power consumption. This optimized configuration is communicated to implementation element 112, which controls or adjusts members of array 104 accordingly. Element 112 may comprise a multiplexing or select circuitry component, and may also comprise a variety of suitable switching components—such as mechanical switches, electrical switches, varactors, or micro-electro-mechanical system (MEMS) switch structures.

The relative timing and frequency for adaptation of the configuration of array 104 may be varied greatly, depending upon a number of device and operational factors. In applications where highly reliable communications are necessary, and greater processing power may be provided, the adaptation process may be performed continuously. In cost or power sensitive applications, the adaptation process may be performed on a periodic basis at desired intervals.

Various embodiments may combine, or collocate, elements of the components described above. For example, some embodiments may provide conformal elements of array 104 collocated with elements of sensor component 108. In other embodiments, a single structural element may function as both an antenna array element and a sensor component element.

Figure 2:
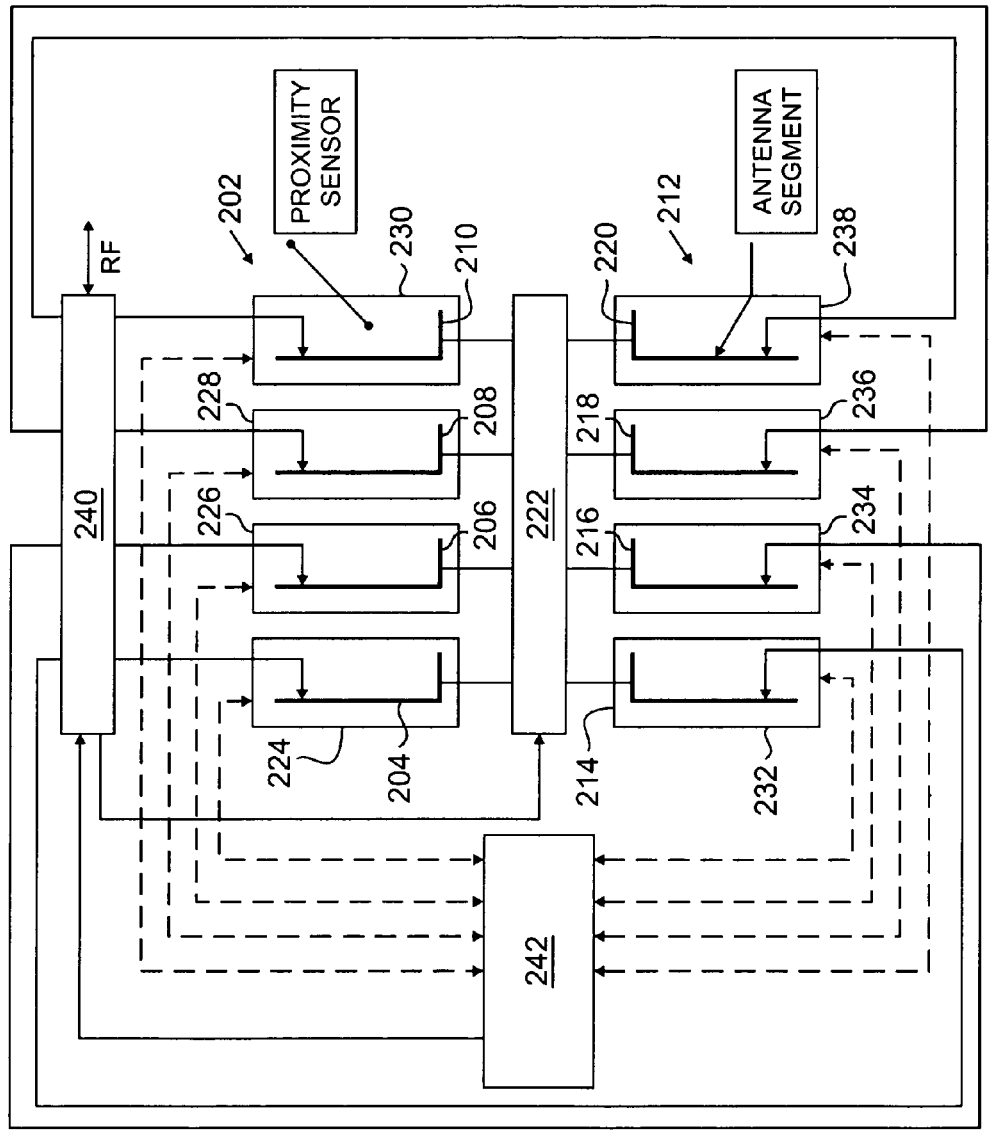
FIG. 2 depicts one embodiment of an antenna system according to certain aspects of the present disclosure.
Figure 3:
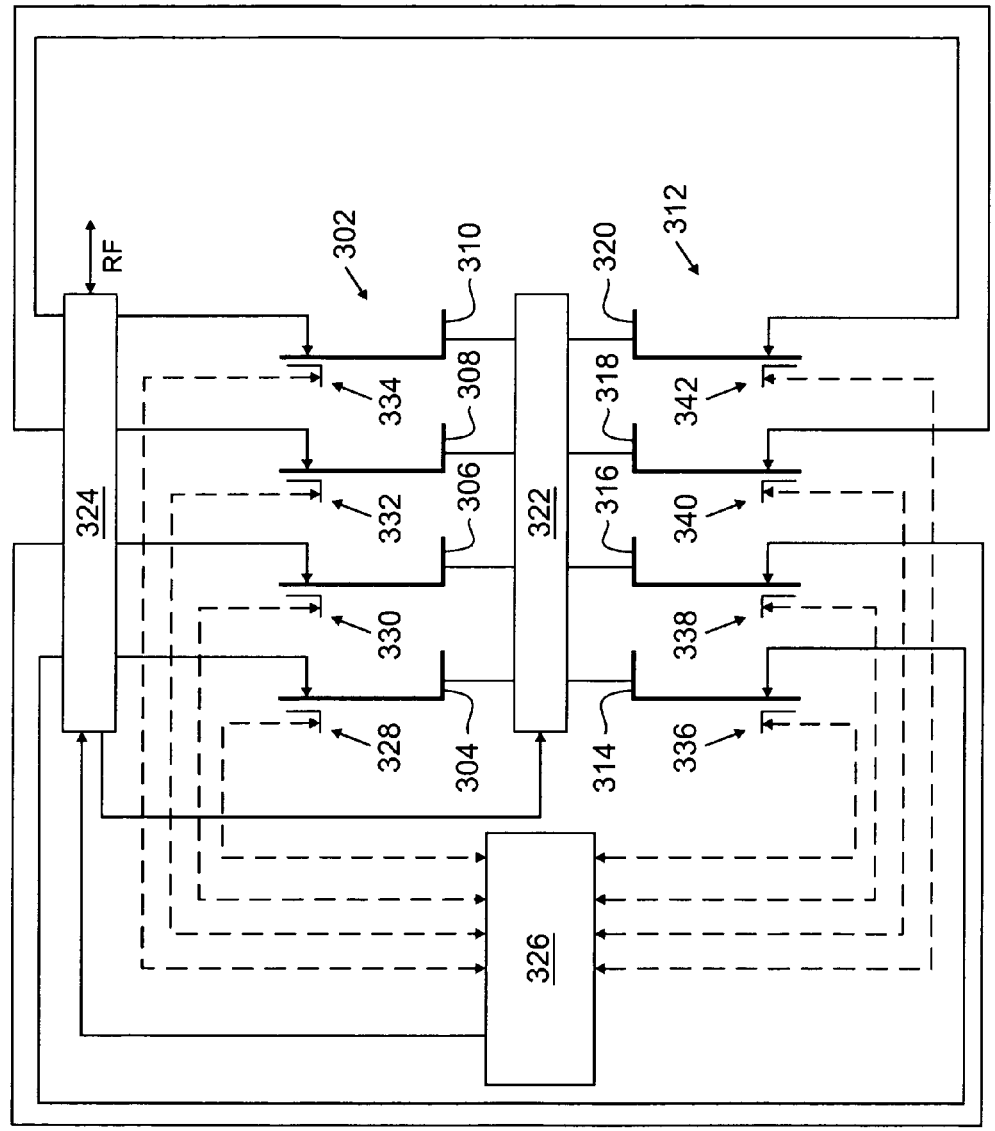
FIG. 3 depicts another embodiment of an antenna system according to certain aspects of the present disclosure.

Referring now to FIG. 2, one illustrative embodiment of an antenna system architecture 200 in accordance with the present disclosure is depicted. In the embodiment depicted, system 200 is based on straight line antenna segments. System 200 comprises a first set 202 of antenna elements 204, 206, 208 and 210. System 200 also comprises a second set 212 of antenna elements 214, 216, 218 and 220. Set 202 and set 212 are operatively coupled together by a cross-connect and combiner element 222—which may comprise, for example, RF relay switches, cross-switch circuitry, mechanical contact switches, strip-line combining segments or MEMS switch devices. A series of proximity sensor elements 224, 226, 228 and 230 are collocated or otherwise operatively associated with antenna elements 204, 206, 208 and 210, respectively. A series of proximity sensor elements 232, 234, 236 and 238 are collocated or otherwise operatively associated with antenna elements 214, 216, 218 and 220, respectively.

System 200 further comprises a path implementation or selection component 240, operatively coupled to the antenna elements of sets 202 and 212, as well as to cross-connect element 222. Selection component 240 is also coupled to a proximity processor component 242. Processor component 242 is operatively coupled to each of the sensor elements 224, 226, 228, 230, 232, 234, 236 and 238. Component 240 and element 222 functionally form an implementation element, as previously described. Via element 222—or, in alternative embodiments, direct connections—component 240 controls or alters the activation or coupling of antenna elements 204, 206, 208, 210, 214, 216, 218 and 220. In one embodiment, component 240 may comprise a multiplexing circuit while element 222 comprises a series of MEMS switches. Other embodiments may provide component 240 or element 222 in other forms consistent with previous description.

Component 242 monitors or polls sensor elements 224, 226, 228, 230, 232, 234, 236 and 238 to detect the proximity of a finger, hand, or some other foreign object to one or more of the antenna elements 204, 206, 208, 210, 214, 216, 218 and 220. Component 242 may make some determination, grading or scaling of which antenna are affected by the foreign object, or to what extent each of the antenna elements 204, 206, 208, 210, 214, 216, 218 and 220 is affected. Component 242 may then cause selection component 240 to set switches to select, and form one or more antenna elements from, a first antenna element (e.g., element 204) from set 202 and a second antenna element (e.g., element 220) from set 212—based upon which antenna elements are least affected by the proximity of the foreign object. In its selection process, component 242 may execute an algorithm that determines which antenna segments—from among a set of unaffected or least affected elements—to connect, in order to maintain desired or required operational parameters such as radiation pattern, efficiency and VSWR.

Once a desired antenna configuration is complete, RF signal transmissions may be conducted over the new configuration. Various embodiments may differ in how the newly configured antenna is activated for signal transmissions. Switching may be immediate and continuous as each antenna element is switched, or it may be delayed until full configuration is complete. Antenna switching may be conducted through any suitable circuitry coupled to antenna element sets 202 and 212. In the embodiment depicted, for example, routing of RF signal traffic to antenna elements is provided through component 240. In alternative embodiments, other circuitry may be providing for routing RF signal traffic to the antenna elements.

In the embodiment depicted, antenna elements 204, 206, 208, 210, 214, 216, 218 and 220 are straight line elements. In other embodiments, however, antenna elements of sets 202 and 212 may comprise curved elements, rectangular patches, square patches, triangular patches, circular patches, spiral patches, fractal arrays or other shapes, or various combinations thereof. All such variations are comprehended hereby.

The system of the present disclosure further comprehends a variety of proximity detection techniques. This is illustrated now in reference to FIG. 3, which depicts another illustrative embodiment of an antenna system architecture 300 in accordance with the present disclosure. With certain exceptions, a substantial portion of the structure and operation of system 300 is similar to that of system 200.

In the embodiment depicted, system 300 comprises a first set 302 of antenna elements 304, 306, 308 and 310. System 300 also comprises a second set 312 of antenna elements 314, 316, 318 and 320. Set 302 and set 312 are operatively coupled together by a cross-connect element 322. System 300 further comprises a path implementation or selection component 324, operatively coupled to the antenna elements of sets 302 and 312. Selection component 324 is also coupled to a proximity processor component 326.

In this embodiment, antenna segments are added or removed such that VSWR is minimized and/or estimated antenna radiation meets a specific SAR requirement. System 300 comprises a series of VSWR sensor elements (i.e., directional couplers) 328, 330, 332, 334, 336, 338, 340 and 342 that are collocated or otherwise operatively associated with antenna elements 304, 306, 308, 310, 314, 316, 318 and 320, respectively. In the embodiment depicted, power reflected by each antenna element is measured and communicated to processor component 326. If VSWR for a given antenna element increases, the reflected power increases. A foreign object (e.g., finger or hand) in close proximity to an antenna element changes its impedance value, which results in a change in VSWR for that element. Changes in VSWR for each antenna element may be compiled, evaluated, graded or scaled by component 326 to determine which antenna elements are least affected by the proximity of the foreign object. Component 326 may then cause selection component 324 to form an antenna from desired first and second antenna elements.

Figure 4:
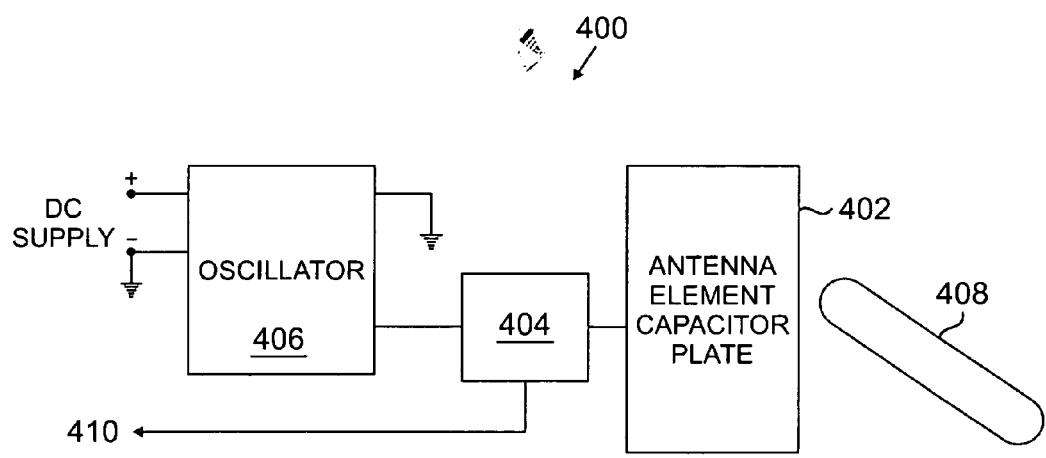
FIG. 4 depicts an embodiment of an antenna circuitry segment according to certain aspects of the present disclosure.

In another embodiment of proximity detection in the present system, each antenna element may form part of a capacitive proximity sensor, as illustrated now in reference to circuitry segment 400 as depicted in FIG. 4. Segment 400 comprises an antenna element 402. A current sensor 404, driven by an oscillator 406, is coupled to element 402. Element 402 is utilized as a capacitance sensor—where the surface of element 402 is an electrified plate, and an approaching foreign object 408 is the other plate. Sensor 404 continually changes excitation voltage on the surface of element 402. The amount of current required to change is measured by sensor 404, and output 410 as an indication of the amount of capacitance between element 402 and object 408. Since the capacitance is inversely proportional to the separation between element 402 and object 408, a high capacitance value indicates that element 402 is obstructed by object 408. The capacitance values are transferred, via output 110, to a processor component for use in path selection.

The system of the present disclosure thus provides a multi-element antenna system that is dynamically reconfigurable responsive to proximity of objects that may degrade antenna performance levels. The present system efficiently provides optimization of antenna performance based upon a number of environmental, regulatory and technology variables. With its adaptive nature, the present system may be readily incorporated within a number of mobile communication devices—without requiring customization.

Given the foregoing description, those of skill in the art will recognize that a number of variations are comprehended hereby—some of which have been already noted above. In certain embodiments, for example, thermally activated devices, such as thermally activated MEMS devices that respond to heat transfer from a finger or hand, may be provided for proximity detection. In other embodiments, proximity detection may be provided by the measurement of light scattered by an object in close proximity to antenna elements. A light emitting diode may be provided as a light source, in conjunction with embedded optical detectors collocated with each antenna segment to detect light scattered from the light emitting diode. In alternative embodiments, antenna element selection may be performed by capacitor activated MEMS switch devices. These and other similar variations, and various combinations thereof, are comprehended hereby.

The embodiments and examples set forth herein are presented to best explain the present disclosure and its practical application, and to thereby enable those skilled in the art to make and utilize the system of the present disclosure. The description as set forth herein is therefore not intended to be exhaustive or to limit the invention to a precise form disclosed. As stated throughout, many modifications and variations are possible in light of the above teaching without departing from the spirit and scope of the following claims.

What is claimed is:

1. A mobile communications device comprising:
   an array of antenna elements;
   a sensing component, disposed along a surface of the mobile communications device proximal to the array of antenna elements, adapted to sense proximity of a foreign object to the array of antenna elements;
   a processor component, communicatively coupled to the sensing component, adapted to receive data characterizing the foreign object's proximity from the sensing component, and to determine a configuration for the array of antenna elements based upon that data; and
   an implementation element, communicatively coupled to the processor component and to the array of antenna elements, adapted to modify the array of antenna elements using a micro-electro-mechanical system responsive to a selector element configured to set switches of the micro-electro-mechanical system to couple selected elements of the array of antenna elements together to set the array of antenna elements in the configuration determined by the processor component in response to the foreign object.

2. The device of claim 1, wherein the mobile communications device provides mobile phone functionality.

3. The device of claim 1, wherein the sensing component comprises a capacitive proximity sensor.

4. The device of claim 1, wherein the sensing component comprises an optical proximity sensor.

5. The device of claim 1, wherein the sensing component comprises a thermal proximity sensor.

6. The device of claim 1, wherein the array of antenna elements comprises an external antenna element.

7. The device of claim 1, wherein the array of antenna elements comprises a conformal antenna element.

8. The device of claim 1, wherein the array of antenna elements comprises an array of discrete wireline segments.

9. The device of claim 1, wherein the array of antenna elements comprises an array of patch antenna elements.

10. The device of claim 1, wherein the processor component comprises a digital signal processor.

11. The device of claim 1, wherein the processor component is adapted to receive qualitative data from the sensing component.

12. The device of claim 1, wherein the processor component is adapted to receive quantitative data from the sensing component.

13. The device of claim 1, wherein the processor component is adapted to adapted to determine a configuration for the array of antenna elements using a look-up table.

14. The device of claim 1, wherein the processor component is adapted to determine a configuration for the array of antenna elements using a mathematical formula.

15. The device of claim 1, wherein the implementation element is integrated with the processor component.

16. A method of providing an adaptive antenna system in a mobile communications device, the method comprising:
   sensing, by a sensing component disposed along a surface of the mobile communications device proximal to the array of antenna elements, a foreign object proximate to an array of antenna elements;
   generating data characterizing proximity of the foreign object to the array of antenna elements;
   determining, by a processing component communicatively coupled to the sensing component, a configuration for the array of antenna elements based upon that data to compensate for the foreign object; and
   modifying, by an implementation element communicatively coupled to the processor component and to the array of antenna elements, the array of antenna elements using a micro-electro-mechanical system responsive to a selector element configured to set switches of the micro-electro-mechanical system to set the array of antenna elements in the configuration determined by the processor component in response to the foreign object the configuration determined by the processor component, and wherein at least one of the switches of the micro-electro-mechanical system is configured to couple a first antenna element to a second antenna element to form a complete antenna element based on the configuration.

17. The method of claim 16, wherein determining comprises utilizing a look-up table.

18. The method of claim 16, wherein determining comprises utilizing an algorithm.

19. The method of claim 16, wherein the sensing component comprises a capacitive proximity sensor.

20. The method of claim 16, wherein the sensing component comprises an optical sensor.

21. The method of claim 16, wherein generating data comprises generating data characterizing voltage standing wave ratio for an antenna element.

22. An adaptive antenna system, for use in a mobile station, comprising:
   an external antenna component;
   an internal array of antenna elements coupled to the external antenna component;
   a proximity sensing component, disposed along a surface of the mobile station proximal to the external antenna component;
   a processor component, communicatively coupled to the sensing component; and
   an implementation element, communicatively coupled to the processor component and to the array of antenna elements, wherein the implementation element comprises a micro-electro-mechanical system and a selector element, and
   wherein a configuration of the array of antenna elements is modified using the micro-electro-mechanical system responsive to:
      a selector element configured to set switches of the micro-electro-mechanical system to couple at least two antenna elements of the array together to form at least one complete antenna element; and
      to data from the proximity sensing component to compensate for the presence of a foreign object, as processed by the processor component.

23. The device of claim 22, wherein the proximity sensing component determines voltage standing wave ratio for an antenna element.

24. A method of adapting a mobile communications device antenna system responsive to proximity of a foreign object, the method comprising:
   sensing, by a sensing component disposed along a surface of the mobile communications device and adapted to determine voltage standing wave ratio for an antenna element, a changes in a voltage standing wave ration due to a proximity of a foreign object to the antenna element;
   generating, data characterizing the sensed changes in voltage standing wave ratio due to proximity of the foreign object to the antenna element;
   determining, by a processor component communicatively coupled to the sensing component, a configuration for the array of antenna elements based upon that data; and
   modifying, by an implementation element communicatively coupled to the processor component and to the array of antenna elements, the array of antenna elements using a micro-electro-mechanical system responsive to a selector element configured to set switches of the micro-electro-mechanical system to couple a first antenna element to a second antenna element to set the array of antenna elements in the configuration determined by the processor component in response to the foreign object.

* * * * *